(12) United States Patent
Takeuchi et al.

(10) Patent No.: US 7,035,193 B2
(45) Date of Patent: Apr. 25, 2006

(54) OBJECTIVE LENS FOR OPTICAL DISC

(75) Inventors: Shuichi Takeuchi, Saitama-ken (JP);
Koichi Maruyama, Tokyo (JP);
Daisuke Koreeda, Saitama-ken (JP)

(73) Assignee: PENTAX Corporation, Tokyo (JP)

( * ) Notice: Subject to any disclaimer, the term of this patent is extended or adjusted under 35 U.S.C. 154(b) by 106 days.

(21) Appl. No.: 11/033,741

(22) Filed: Jan. 13, 2005

(65) Prior Publication Data
US 2005/0152259 A1 Jul. 14, 2005

(30) Foreign Application Priority Data
Jan. 13, 2004 (JP) .............................. 2004-005820

(51) Int. Cl.
*G11B 7/00* (2006.01)
(52) U.S. Cl. .............................. 369/112.13; 369/112.08
(58) Field of Classification Search .......... 369/112.08, 369/112.07, 112.13, 112.19, 44.23, 44.24, 369/112.18, 112.2, 112.23
See application file for complete search history.

(56) References Cited

U.S. PATENT DOCUMENTS

| | | | |
|---|---|---|---|
| 5,696,750 A | 12/1997 | Katayama | |
| 6,118,594 A | 9/2000 | Maruyama | |
| 6,594,222 B1 | 7/2003 | Maruyama | |
| 6,781,943 B1 * | 8/2004 | Saito ..................... | 369/112.08 |
| 2004/0246873 A1 | 12/2004 | Maruyama et al. | |
| 2005/0078593 A1 | 4/2005 | Maruyama et al. | |

FOREIGN PATENT DOCUMENTS

| | | |
|---|---|---|
| JP | 9-54973 | 2/1997 |
| JP | 2000-81566 | 3/2000 |
| JP | 2001-249273 | 9/2001 |

* cited by examiner

*Primary Examiner*—Nabil Hindi

(57) ABSTRACT

An objective lens for recording data to and/or reproducing data from first and second optical discs. The objective lens is provided with at least one surface including a plurality of annular zones divided by steps. The steps has functions of phase shifting a wavefront of light passing through the plurality of annular zones so that a beam spot formed at a converging point of an average wavefront of the wavefront phase shifted by the steps is used for the first and second optical discs. The plurality of annular zones of the at least one surface includes at least one annular zone structure which includes first and second annular zone groups, each of which has at least three steps for phase shifting the wavefront in a first direction, and a first return step which is a step formed at a boundary between the first and second annular zone groups. The first return step phase shifts the wavefront in a second direction opposite to the first direction. An absolute value $|\Delta\psi 1|$ of a phase shifting amount of the first light beam given by the first return step satisfies a condition: $6\pi<|\Delta\psi 1|<14\pi$ ... (1). The absolute value $|\Delta\psi 1|$ of the phase shifting amount of the first light beam given by the first return step is smaller than larger one of an absolute value of a sum of phase shift amounts given by the first annular zone group and an absolute value of a sum of phase shift amounts given by the second annular zone group.

18 Claims, 2 Drawing Sheets

OBJECTIVE LENS FOR OPTICAL DISC

BACKGROUND OF THE INVENTION

Figure 1:
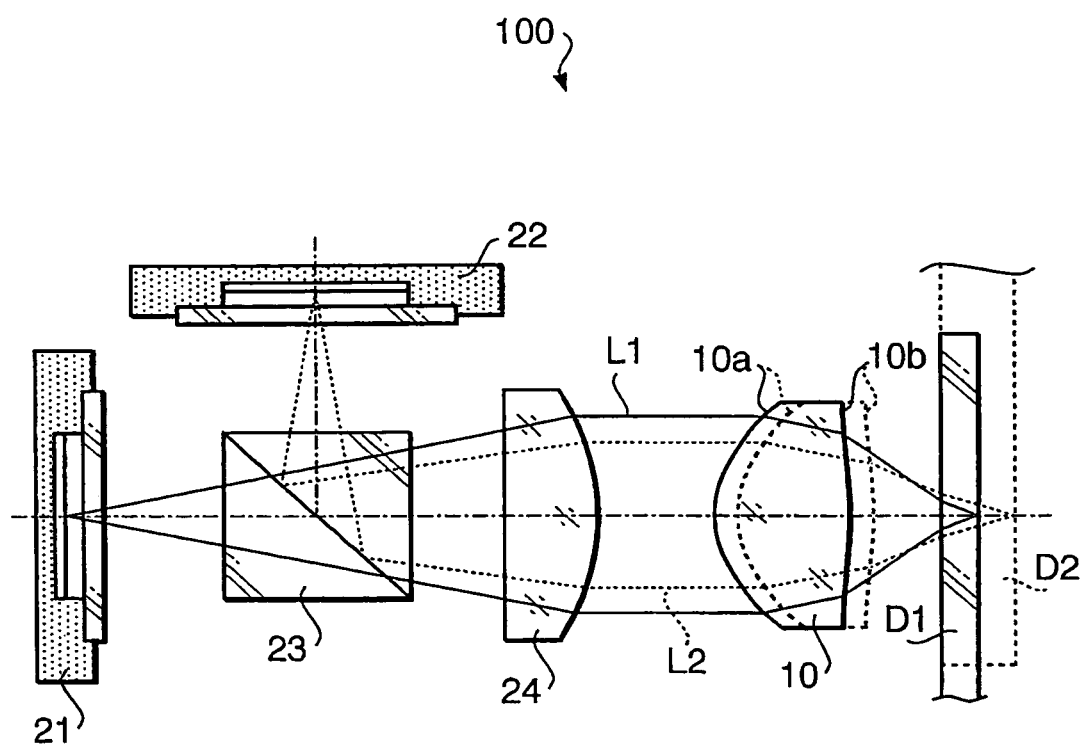

The present invention relates to an objective lens for an optical disc drive, which is capable of recording data to and/or reproducing data from two types of optical discs having different thicknesses of cover layers and/or different recording densities.

In general, an optical pick-up for an optical disc drive is provided with a laser source such as a laser diode, an objective lens which converges the laser beam emitted by the laser source on a recording surface of the optical disc to form a beam spot on the recording surface, and a signal detecting system that receives the laser beam which is reflected from the recording surface and passes through the objective lens. The signal detecting system produces various signals based on the received laser beam.

There are various types of optical discs having different thicknesses of cover layers and/or different recording densities. For example, a DVD (digital versatile disc) has a recording density higher that that of a CD (compact disc) or a CD-R (CD Recordable) and has a cover layer thinner than that of the CD or CD-R. DVD-R, DVD–RW and DVD+RW are classified as a DVD standard because DVD-R, DVD–RW and DVD+RW have substantially the same thickness of the cover layer and a required numerical aperture as those of the DVD. Also, the CD-R and CD-RW are classified as a CD standard because the CD-R and CD-RW have substantially the same thickness of the cover layer and a required numerical aperture as those of the CD.

The optical disc drive is required to correct a spherical aberration caused by differences between the thicknesses of cover layers of the various types of optical discs. Each of Japanese Patent Provisional Publications No. HEI 9-54973 (hereafter, referred to as a document 1), 2000-81566 (hereafter, referred to as a document 2), and 2001-249273 (hereafter, referred to as a document 3) discloses an optical system of an optical disc drive configured to correct the spherical aberration caused by the differences of the thicknesses of cover layers of optical discs.

According to the publications, the optical system is provided with an optical surface having a special structure (called a phase shift surface, a diffracting surface, or a hologram surface) formed on an optical element located adjacent to an objective lens or formed on the objective lens so as to correct (cancel) the spherical aberration caused by the change of the thickness of the cover layer of the optical disc by utilizing a phenomenon that a condition of the spherical aberration changes in the optical surface having the special structure depending on a wavelength of a light beam.

Each of the phase shift surface, the diffracting surface and the hologram surface represents a surface structure configured such that a plurality of minute steps are formed on a base shape of an optical element. That is, the phase shift surface, the diffracting surface and the hologram surface have the function of giving a phase shift (or an optical path length difference) at each step so that light beams passed through adjacent zones lying at both sides of each step interfere with each other and thereby an optical effect other than refraction acts on the light beams.

More specifically, the optical system disclosed in the document 1 is configured to have a hologram surface formed on an optical element located adjacently to an objective lens. It is also disclosed in the document 1 that the hologram surface is formed by etching. In order to simplify a manufacturing process of the hologram surface and to improve the precision of the manufacturing process, the hologram surface is designed to have a plurality of step-like structures each of which has approximately four steps. However, the optical system can not correct the change of the spherical aberration caused depending on a variation of ambient temperature if the objective lens is made of resin.

In the document 2, an objective lens having a surface on which a diffracting structure having the function of phase shifting the light beams passing therethrough is formed. In contrast to the optical system of the document 1, the objective lens of the document 2 can correct the spherical aberration caused depending on the variation of ambient temperature even if the objective lens is made of resin. The objective lens of the document 2 is configured to correct the spherical aberration caused in the cover layer of the optical disc being used through the use of a fact that a condition of the spherical aberration is changed by the diffracting structure depending on a wavelength of the light beam passing through the diffracting structure.

However, the optical system of the document 2 has a drawback that the change of the spherical aberration due to the ambient temperature is overcorrected by the change of the spherical aberration caused by the objective lens.

As described above, the optical system of the document 2 corrects the spherical aberration through use of the wavelength dependence of the change of the spherical aberration in the objective lens. For this reason, the optical system of the document 2 is required to use a light source having a property of a relatively small individual difference (i.e. variation of wavelength).

The optical system of the document 3 includes an objective lens having a surface on which a diffracting structure is formed for phase shifting the light beams passing therethrough. The objective lens of the document 3 has a low NA (numerical aperture) area contributing to the formation of a beam spot for each of the light beam for the optical disc having a relatively low recording density (e.g. CD) and the light beam for the optical disc having a relatively high recording density (e.g. DVD), and has a high NA area contributing to the formation of a beam spot only for the light beam for the optical disc having a relatively high density (e.g. DVD).

The diffracting structure formed in the low NA area has substantially the same structure as the diffracting structure shown in the document 2. The high NA area is formed such that the change of the spherical aberration is reduced to a low level even if the ambient temperature changes by a relatively large amount so that the change of the spherical aberration in the entire optical system due to the temperature variation is reduced.

It is generally required to increase a NA (numerical aperture) to further enhance a recordation efficiency of the optical disc having a relatively low recording density. Therefore, in order to increase NA for the optical disc having the relatively low recording density, it is required to broaden the low NA area. However, if the low NA area of the objective lens is broadened, a disadvantage of the objective lens (i.e. overcorrecting the spherical aberration) is intensified.

SUMMARY OF THE INVENTION

The present invention is advantageous in that it provides an objective lens configured to sufficiently suppress a variation of a spherical aberration in a wide range of ambient temperature, and to have sufficient tolerance to an individual variation of a wavelength of a light source even if the objective lens is made of resin.

According to an aspect of the invention, there is provided an objective lens for recording data to and/or reproducing data from first and second optical discs. The first optical disc has a recording density higher than that of the second optical disc. A first light beam is used for the first optical disc, and a second light beam is used for the second optical disc. The second light beam has a wavelength longer than that of the first light beam. The objective lens is provided with at least one surface including a plurality of annular zones divided by steps. The steps has functions of phase shifting a wavefront of light passing through the plurality of annular zones so that a beam spot formed at a converging point of an average wavefront of the wavefront phase shifted by the steps is used for recordation and/or reproduction for the first and second optical discs.

Further, the plurality of annular zones of the at least one surface includes at least one annular zone structure. The at least one annular zone structure includes first and second annular zone groups each of which has at least three steps for phase shifting the wavefront in a first direction, and a first return step which is a step formed at a boundary between the first and second annular zone groups. The first return step phase shifts the wavefront in a second direction opposite to the first direction. An absolute value $|\Delta\psi1|$ of a phase shifting amount of the first light beam given by the first return step satisfies a condition:

$$6\pi < |\Delta\psi1| < 14\pi \qquad (1).$$

The absolute value $|\Delta\psi1|$ of the phase shifting amount of the first light beam given by the first return step is smaller than larger one of an absolute value of a sum of phase shift amounts given by the first annular zone group and an absolute value of a sum of phase shift amounts given by the second annular zone group.

By forming the first return step, it becomes possible to avoid a phenomenon that the effect of correction for a variation of a spherical aberration due to temperature variation becomes excessively large. That is, it is possible to suitably converge the first and second light beams onto the first and second optical discs, respectively, even if the objective lens is made of resin.

Further, by satisfying the condition (1), dependency on the wavelength of a change of performance of the objective lens can be sufficiently suppressed and thereby tolerance to an individual variation of a wavelength can be enhanced. Further, it is possible to effectively prevent an occurrence of a phenomenon that the correction for a variation of the spherical aberration due to temperature variation becomes insufficient.

Optionally, the at least one surface may include an inner area contributing to convergence of both of the first and second light beams and an outer area contributing to only convergence of the first light beam. In this case, the first return step is formed within the inner area.

Still optionally, the absolute value $|\Delta\psi1|$ of the phase shifting amount of the first light beam given by the first return step may satisfy a condition:

$$9.4\pi < |\Delta\psi1| < 10.6\pi \qquad (2)$$

when the first optical disc is compliant with a DVD standard, and the second optical disc is compliant with a CD standard.

Still optionally, the at least one surface may include a second return step which is a step formed at a boundary between the inner area and the outer area, the second return step phase shifting the wavefront in the second direction opposite to the first direction.

According to another aspect of the invention, there is provided an objective lens for recording data to and/or reproducing data from first and second optical discs. The first optical disc has a recording density higher than that of the second optical disc. A first light beam is used for the first optical disc, and a second light beam is used for the second optical disc. The second light beam has a wavelength longer than that of the first light beam. The objective lens is provided with at least one surface including a plurality of annular zones divided by steps. The steps has functions of giving optical path length differences to light passing through the plurality of annular zones so that a beam spot formed by light passing through the at least one surface is used for recordation and/or reproduction for the first and second optical discs.

Further, the plurality of annular zones of the at least one surface includes at least one annular zone structure. The at least one annular zone structure includes first and second annular zone groups each of which has at least three steps for giving optical path length differences in a first direction, and a first return step which is a step formed at a boundary between the first and second annular zone groups. The first return step gives an optical path length difference in a second direction opposite to the first direction. An absolute value $|\Delta OPD|$ of an optical path length difference given to the first light beam by the first return step satisfies a condition:

$$3 < \left|\frac{\Delta OPD}{\lambda 1}\right| < 7 \qquad (3)$$

where $\lambda 1$ represents a wavelength of the first light beam. The absolute value $|\Delta OPD|$ of the optical path length difference given to the first light beam by the first return step is smaller than larger one of an absolute value of a sum of the optical path length differences given by the first annular zone group and an absolute value of a sum of the optical path length differences given by the second annular zone group.

By forming the first return step, it becomes possible to avoid a phenomenon that the effect of correction for a variation of a spherical aberration due to temperature variation becomes excessively large. That is, it is possible to suitably converge the first and second light beams onto the first and second optical discs, respectively, even if the objective lens is made of resin.

Further, by satisfying the condition (3), dependency on the wavelength of a change of performance of the objective lens can be sufficiently suppressed and thereby tolerance to an individual variation of a wavelength can be enhanced. Further, it is possible to effectively prevent an occurrence of a phenomenon that the correction for a variation of the spherical aberration due to temperature variation becomes insufficient.

Optionally, the at least one surface may include an inner area contributing to convergence of both of the first and second light beams and an outer area contributing to only convergence of the first light beam. In this case, the first return step is formed within the inner area.

Still optionally, the absolute value $|\Delta OPD|$ of the optical path length difference given to the first light beam by the first return step satisfies a condition:

$$4.7 < \left|\frac{\Delta OPD}{\lambda 1}\right| < 5.3 \qquad (4)$$

when the first optical disc is compliant with a DVD standard, and the second optical disc is compliant with a CD standard.

Still optionally, the at least one surface may include a second return step which is a step formed at a boundary between the inner area and the outer area, the second return step giving an optical path length difference in the second direction opposite to the first direction.

According to another aspect of the invention, there is provided an objective lens for recording data to and/or reproducing data from first and second optical discs. The first optical disc has a recording density higher than that of the second optical disc. A first light beam is used for the first optical disc, and a second light beam being used for the second optical disc. The second light beam has a wavelength longer than that of the first light beam. The objective lens is provided with at least one surface including a diffracting structure. The diffracting structure includes a plurality of annular zones divided by steps so as to provide a function of suitably converging the first and second light beams onto recording surfaces of the first and second optical discs, respectively. The diffracting structure includes at least first and second annular zone groups. The first annular zone group and the second annular zone group are located in that order from an optical axis of the objective lens.

Further, the diffracting structure is configured to satisfy conditions (5) trough (7) or to satisfy conditions (5), (8) and (9).

$$4<|\phi_{i+1}(h_i)-\phi_i(h_i)|<8 \quad (5)$$

$$|\phi_i(h_i)-\phi_i(h_{i-1})|>|\phi_{i+1}(h_i)-\phi_i(h_i)| \quad (6)$$

$$\{\phi_i(h_i)-\phi_i(h_{i-1})\}/\{\phi_{i+1}(h_i)-\phi_i(h_i)\}<0 \quad (7)$$

$$|\phi_{i+1}(h_{i+1})-\phi_{i+1}(h_i)|>|\phi_{i+1}(h_i)-\phi_i(h_i)| \quad (8)$$

$$\{\phi_{i+1}(h_{i+1})-\phi_{i+1}(h_i)\}/\{\phi_{i+1}(h_i)-\phi_i(h_i)\}<0 \quad (9)$$

where $\Phi_i(h)$ represents an additional optical path length given by the diffracting structure in an i-th annular zone group, and hi represents a height of a boundary position between the i-th annular zone group and a (i+1)-th annular zone group. The $\Phi_i(h)$ is expressed by a following equation:

$$\Phi_i(h)=(P_{0i}+P_{2i}h^2+P_{4i}h^4+P_{6i}h^6+\ldots)\times m$$

where $P_{0i}$, $P_{2i}$, $P_{4i}$ and $P_{6i}$ are coefficients of 0-th, second, fourth and sixth orders regarding the additional optical path length of the i-th annular zone group, h represents a height from the optical axis, m represents a diffraction order used for recording and/or reproducing operation, and $h_{i-1}$ is 0 if i is 0.

With this structure, it becomes possible to avoid a phenomenon that the effect of correction for a variation of a spherical aberration due to temperature variation becomes excessively large. That is, it is possible to suitably converge the first and second light beams onto the first and second optical discs, respectively, even if the objective lens is made of resin.

Dependency on the wavelength of a change of performance of the objective lens can be sufficiently suppressed and thereby tolerance to an individual variation of a wavelength can be enhanced. Further, it is possible to effectively prevent an occurrence of a phenomenon that the correction for a variation of the spherical aberration due to temperature variation becomes insufficient.

Optionally, the at least one surface may include an inner area contributing to convergence of both of the first and second light beams and an outer area contributing to only convergence of the first light beam. In this case, the boundary position is formed within the inner area.

Still optionally, the objective lens may satisfy a condition:

$$5.7<|\phi_{i+1}(h_i)-\phi_i(h_i)|<6.3 \quad (10)$$

when the first optical disc is compliant with a DVD standard, and the second optical disc is compliant with a CD standard.

Still optionally, the at least one surface may have a first step formed at a boundary between the inner area and the outer area. The first step gives an optical path length difference in a direction equal to a direction of the optical path length difference given by the boundary position between the i-th annular zone group and a (i+1)-th annular zone group.

With regard to the above mentioned three aspects of the invention, a wavefront aberration of the first light beam passing through the inner area may be lower than or equal to ±0.1λ at a vicinity of a recording surface of the first optical disc.

Optionally, the objective lens may be a single-element lens.

BRIEF DESCRIPTION OF THE ACCOMPANYING DRAWINGS

Figure 2:
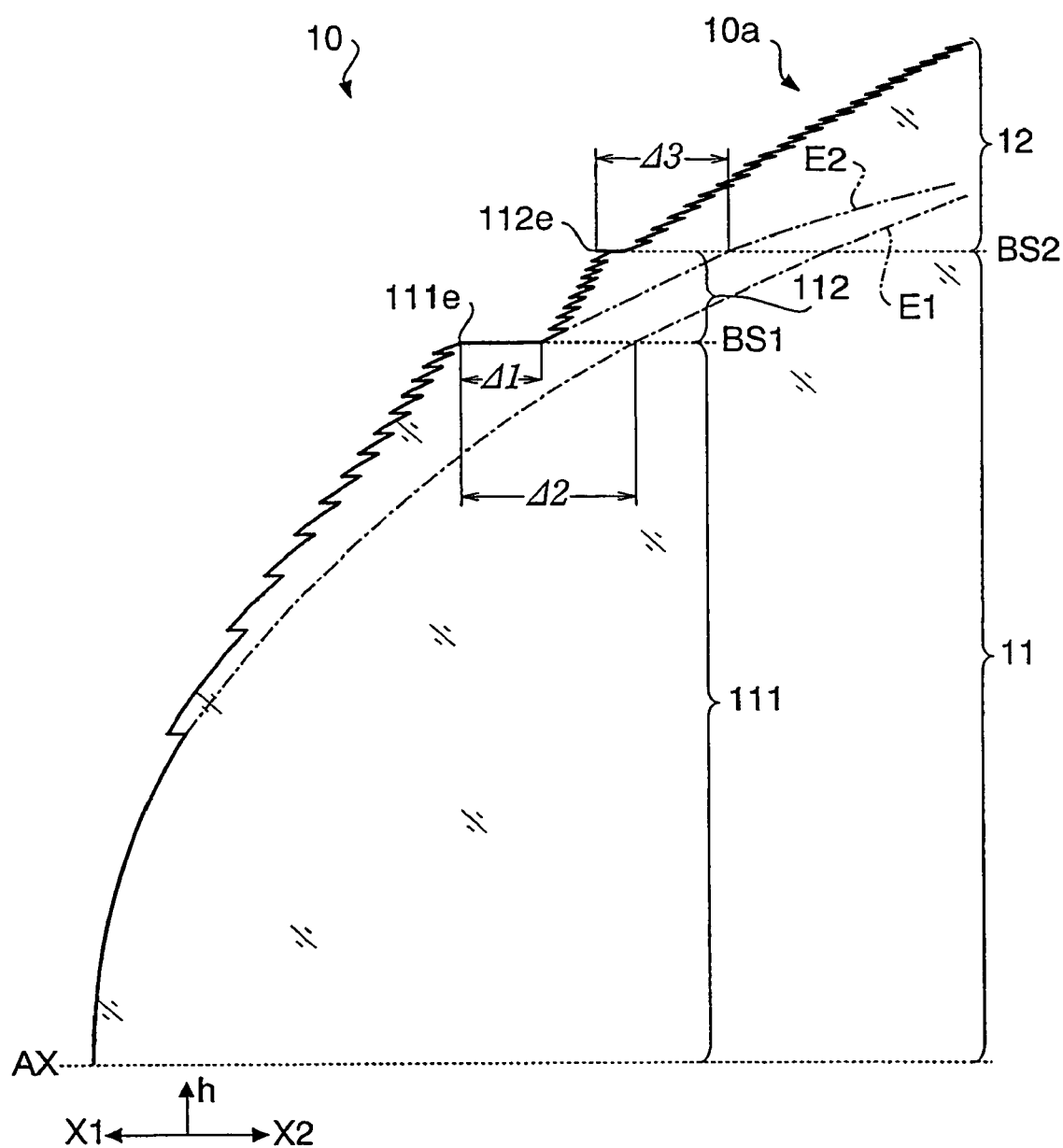

FIG. 1 is an optical block diagram of an optical system including an objective lens according to an embodiment of the invention; and FIG. 2 is a cross-sectional view of the objective lens including an optical axis thereof, illustrating in detail an annular zone structure formed on a surface of the objective lens.

DETAILED DESCRIPTION OF THE EMBODIMENTS

Hereinafter, an embodiment according to the invention is described with reference to the accompanying drawings.

FIG. 1 is an optical block diagram of an optical system 100 including an objective lens 10 according to an embodiment of the invention. The optical system 100 is used to record data to and/or reproduce data from two types of optical discs D1 and D2. The optical disc D1 (e.g. DVD) has a recording density higher than that of the optical disc D2 (e.g. CD) and has a cover layer thinner than that of the optical disc D2. In FIG. 1, the optical disc D1 is indicated by a solid line, and the optical disc D2 is indicated by a dashed line.

As shown in FIG. 1, the optical system 100 includes first and second light sources 21 and 22, a beam splitter 23, a coupling lens 24 and the objective lens 10. In FIG. 1, a reference axis of the optical system 100 is indicated by a chain line. Each of the optical discs D1 and D2 is placed on a turn table (not shown) and is rotated for recording/reproducing operation.

For recording/reproducing operation of the optical disc D1 having a relatively high recording density, the light source 21, which emits a laser beam L1 having a wavelength shorter than that of a laser beam L2 emitted by the light source 22, is used to form a relatively small beam spot on a recording surface of the optical disc D1. For recording/reproducing operation of the optical disc D2 having a relatively low recording density, the light source 22, which emits the laser beam L2 having a relatively long wavelength, is used to form a beam spot whose diameter is larger than that formed by the laser beam L1 of the light source 21. In FIG. 1, the laser beam L1 is indicated by a solid line, and the laser beam L2 is indicated by a dashed line.

The laser beam L1 (L2) emitted by the light source 21 (22) is incident on the coupling lens 24 through the beam splitter 23. Since each of the light sources 21 and 22 is located at a focal point of the coupling lens 24, the laser beam L1 (L2) is collimated by the coupling lens 24. That is, the coupling lens 24 functions as a collimator lens in this embodiment. The laser beam L1 (L2) collimated by the coupling lens 24 is then incident on the objective lens 10.

The objective lens 10 is made of resin and has a coupling lens side surface 10a and an optical disc side surface 10b which are aspherical surfaces. The objective lens 10 is moved by a driving mechanism (not shown) along a direction of an optical axis thereof (i.e. a focusing direction). In FIG. 1, a position of the objective lens 10 for recording/reproducing operation of the optical disc D1 is indicated by a solid line, and a position of the objective lens 10 for recording/reproducing operation of the optical disc D2 is indicated by a dashed line.

The laser beam L1 is converged by the objective lens 10 to form a beam spot on the recording surface of the optical disc D1 (i.e., to form a beam spot in the vicinity of the recording surface of the optical disc D1). The laser beam L2 is converged by the objective lens 10 to form a beam spot on the recording surface of the optical disc D2 (i.e., to form a beam spot in the vicinity of the recording surface of the optical disc D1). As described above, thicknesses of cover layers of the optical discs D1 and D2 are different from each other. Therefore, a condition of the spherical aberration changes depending on the type of the optical disc being used.

In this embodiment, at least one surface of the objective lens 10 is provided with a plurality of annular zones divided by steps concentrically formed about the optical axis of the objective lens 10 (hereafter, such a structure is referred to as an annular zone structure). With this structure, the objective lens 10 sufficiently suppresses the spherical aberration of the laser beam L1 to form a beam spot suitable for the recording/reproducing operation of the optical disc D1 on the recording surface of the optical disc D1, and sufficiently suppresses the spherical aberration of the laser beam L2 to form a beam spot suitable for the recording/reproducing operation of the optical disc D2 on the recording surface of the optical disc D2.

FIG. 2 is a cross-sectional view of the objective lens 10 including the optical axis AX of the objective lens 10, illustrating in detail the annular zone structure formed on the surface 10a. In FIG. 2, three directions X1, X2 and h are defined as follows. A direction which is parallel with the optical axis AX and heads for the surface 10a from the surface 10b is defined as a direction X1, and a direction which is parallel with the optical axis AX and heads for the surface 10b from the surface 10a is defined as a direction X2. A direction which is perpendicular to the optical axis AX and heads for the upper side in FIG. 2 is defined as a h direction (in which the height of the objective lens 10 increases).

As shown in FIG. 2, the surface 10a is divided into an inner area 11 and an outer area 12. In the inner area 11 and the outer area 12, the annular zone structures are formed. The annular zone structure in the inner area 11 is configured so that the laser beams L1 and L2 are converged onto the recording surfaces of the optical discs D1 and D2, respectively.

The annular zone structure in the outer area 12 is configured so that the laser beam L1 is suitably converged onto the recording surface of the optical disc D1. That is, the outer area 12 does not contribute to the formation of the beam spot for the laser beam L2. The outer area 12 functions as an aperture stop for the laser beam L2.

Further, the inner area 11 is divided into a first annular zone group 111 and a second annular zone group 112. Each of the first and second annular zone groups 111 and 112 has at least three steps each of which operates to phase shifts a wavefront of the laser beam in the direction X1.

Between the first annular zone group 111 and the second annular zone group 112, a return step BS1 is formed to phase shift the wavefront of the laser beam in the direction X2. By forming the return step BS1 in the inner area 11, it becomes possible to avoid a phenomenon that the effect of correction for a variation of the spherical aberration due to temperature variation becomes excessively large. To increase effectiveness of such an advantage provided by the return step BS1, the return step BS1 is configured to satisfy a condition (1):

$$6\pi < |\Delta\psi 1| < 14\pi \tag{1}$$

where $|\Delta\psi 1|$ represents an absolute value of a phase shifting amount of the laser beam L1 given by the return step BS1.

By satisfying the condition (1), dependency on the wavelength of a change of performance of the objective lens 10 can be sufficiently suppressed and thereby tolerance to an individual variation of a wavelength can be enhanced. If $|\Delta\psi 1|$ gets lower than the lower limit of the condition (1), it becomes impossible to avoid a phenomenon that the effect of correction for a variation of the spherical aberration due to temperature variation becomes excessively large. If $|\Delta\psi 1|$ gets larger than the upper limit of the condition (1), the size of each step becomes large and thereby the manufacturing process of the objective lens becomes too difficult. Further, in such a case, a variation of aberrations with respect to a slight change of the wavelength becomes large.

If the optical discs D1 and D2 are the DVD and CD respectively, the laser beam L1 having the wavelength of approximately 660 nm and the laser beam L2 having the wavelength of approximately 780 nm are used. It is noted that a ratio of the wavelength of the laser beam L1 to the wavelength of the laser beam L2 is approximately 5:6. If the objective lens 10 is used in such a condition, the objective lens 10 is configured such that the phase shifting amount $|\Delta\psi 1|$ is approximately $10\pi$. To be more precise, the objective lens 10 is configured to satisfy a condition (2).

$$9.4\pi < |\Delta\psi 1| < 10.6\pi \tag{2}$$

By satisfying the condition (2), phases of the laser beam L2 passing through the return step BS1 become identical to each other. Therefore, both of the laser beams L1 and L2 passing through the return step BS1 configured to satisfy the condition (2) are suitably converged onto the recording surfaces of the optical discs D1 and D2, respectively.

The objective lens 10 may be configured such that the phase shifting amount $|\Delta\psi 1|$ is smaller than larger one of two phase shift amounts given to the laser beam L1 by the annular zone groups 111 and 112. By this structure, it becomes possible to effectively prevent an occurrence of a phenomenon that the correction for a variation of the spherical aberration due to temperature variation becomes insufficient.

With regard to the function attained by the annular zone groups 111 and 112 and the return step BS1 described above, it is possible to consider that the annular zone groups 111 and 112 and the return step BS1 give an optical path length difference to the laser beam passing therethrough. Therefore, the conditions (1) and (2) can be expressed by the following conditions (3) and (4), respectively.

$$3 < \left|\frac{\Delta OPD}{\lambda 1}\right| < 7 \quad (3)$$

$$4.7 < \left|\frac{\Delta OPD}{\lambda 1}\right| < 5.3 \quad (4)$$

In the above conditions (3) and (4), $\Delta OPD$ represents an optical path length difference given to the laser beam L1 by the return step BS1, and $\lambda 1$ represents the wavelength of the laser beam L1.

Considering the annular zone structure to be a diffracting structure, the configuration regarding the return step BS1 and the annular zone groups 111 and 112 is explained as follows.

An additional optical path length given by an i-th annular zone group is expressed by a following equation:

$$\Phi i(h) = (P_{0i} + P_{2i}h^2 + P_{4i}h^4 + P_{6i}h^6 + \ldots) \times m$$

where $P_{0i}$, $P_{2i}$, $P_{4i}$ and $P_{6i}$ are coefficients of 0-th, second, fourth and sixth orders regarding the i-th annular zone group, h represents a height from the optical axis, m represents a diffraction order used for recording/reproducing operation.

If the height of a boundary position between the i-th annular zone group and the (i+1)-th annular zone group is represented by hi, the configuration of the diffracting structure is explained as follows. That is, the diffracting structure is configured to satisfy conditions (5) trough (7) or to satisfy conditions (5), (8) and (9).

$$4 < |\phi_{i+1}(h_i) - \phi_i(h_i)| < 8 \quad (5)$$

$$|\phi_i(h_i) - \phi_i(h_{i-1})| > |\phi_{i+1}(h_i) - \phi_i(h_i)| \quad (6)$$

$$\{\phi_i(h_i) - \phi_i(h_{i-1})\} / \{\phi_{i+1}(h_i) - \phi_i(h_i)\} < 0 \quad (7)$$

$$|\phi_{i+1}(h_{i+1}) - \phi_{i+1}(h_i)| > |\phi_{i+1}(h_i) - \phi_i(h_i)| \quad (8)$$

$$\{\phi_{i+1}(h_{i+1}) - \phi_{i+1}(h_i)\} / \{\phi_{i+1}(h_i) - \phi_i(h_i)\} < 0 \quad (9)$$

In the above conditions (5) through (9), $h_{i-1}$ is 0 if i is 0.

With regard to the configuration of the return step BS1 and the annular zone groups 111 and 112, i=1 is assigned to the conditions (5) through (9). With regard to the conditions (5) through (9), $|\phi_{i+1}(h_i) - \phi_i(h_i)|$ represents a length $\Delta 1$ of the return step BS1, $|\phi_i(h_i) - \phi_i(h_{i-1})|$ represents a length $\Delta 2$ measured along a line parallel with the optical axis AX from an end position 111e of the outermost refractive surface in the annular zone group 111 to an extension E1 (indicated by a chain line in FIG. 2) of the innermost refractive surface in the annular zone group 111, and $|\phi_{i+1}(h_{i+1}) - \phi_{i+1}(h_i)|$ represents a length $\Delta 3$ measured along a line parallel with the optical axis AX from an end position 112e of the outermost refractive surface in the annular zone group 112 to an extension E2 (indicated by a chain double-dashed line in FIG. 2) of the innermost refractive surface in the annular zone group 112.

It should be noted that although, in this embodiment, it is regarded that the optical path length difference (phase shifting amount) given at each step is proportional to the size of each step in a direction of the optical axis, in actuality the optical path length difference given by each step changes depending on the inclination of a line normal to an refractive surface with respect to the optical axis and/or an angle formed between an incident light ray and the optical axis.

Also, the condition (4) can be changed to the following condition (10).

$$5.7 < |\phi_{i+1}(h_i) - \phi_i(h_i)| < 6.3 \quad (10)$$

As shown in FIG. 2, a return step BS 2 is formed between the inner area 11 and the outer area 12. The return step BS2 has substantially the same function as that of the return step BS1. By forming the return step BS2 additionally to the return step BS1, it becomes possible to suitably avoid a phenomenon that the effect of correction for a variation of the spherical aberration due to temperature variation (and/or an unintended wavelength shift) becomes excessively large.

Hereafter, one concrete example (a first example) according to the embodiment of the invention will be explained. In the first example, the optical disc D1 is the DVD having the thickness of the cover layer of 0.6 mm, and the optical disc D2 is the CD having the thickness of the cover layer of 1.2 mm.

FIRST EXAMPLE

An optical system of the first example according to the embodiment will be explained below with reference to FIG. 1. FIG. 1 also shows the optical system 100 according to the first example. In the first example, the objective lens 10 is a single-element objective lens, and the surface 10a is provided with a minute step structure having a plurality of steps. The surface 10b of the objective lens 10 is a rotationally-symmetrical aspherical surface. Table 1 shows optical performance of the objective lens 10. Table 2 shows a numerical configuration of the optical system 100 according to the first example.

TABLE 1

|  | DVD | CD |
|---|---|---|
| M | 0.00 | 0.00 |
| f (mm) | 3.00 | 3.02 |
| Design wavelength (nm) | 660 | 785 |
| design NA | 0.65 | 0.53 |

In Table 1, M and f represent the magnification and the focal length of the objective lens 10, respectively. Design wavelength means that a wavelength of light suitable for the recordation/reproduction for each optical disc. In this example, the design wavelength for the disc D1 (DVD) is 660 nm, and the design wavelength for the disc D2 (CD) is 785 nm. The design NA means a numerical aperture on an image side suitable for the recording/reproducing operation for each optical disc.

The objective lens 10 is used as a finite optical system (i.e., a collimated beam is incident on the objective lens).

TABLE 2

| surface number | r | d (DVD) | d (CD) | n | ν |
|---|---|---|---|---|---|
| 1 (h < 1.600) | 1.874 | 2.00 | 2.00 | 1.544 | 55.7 |
| 1 (h ≥ 1.600) | 1.880 | 2.00 | 2.00 | 1.544 | 55.7 |
| 2 | −7.530 | 1.50 | 1.13 | | |
| 3 | | 0.60 | 1.20 | 1.585 | 29.9 |
| 4 | | — | — | | |

In Table 2, r denotes a radius of curvature (mm) of each lens surface, "d (DVD)" denotes a thickness of a lens or an interval between lenses (i.e., d denotes a distance from a lens surface to a next lens surface) when the DVD is used, "d (CD)" denotes a thickness of a lens or an interval between lenses (i.e., d denotes a distance from a lens surface to a next lens surface) when the CD is used, n denotes a refractive index at d-ray (588 nm), ν denotes an Abbe number at the d-ray, and h denotes a height from the optical axis.

In Table 2, the surface numbers #1–#4 represent optical surfaces of optical components in the optical system 100. The surfaces #1 and #2 respectively represent the surface 10a and the surface 10b of the objective lens 10. The surface #3 represents the cover layer of the optical disc, and the surface #4 represents the recording surface of the optical disc.

As shown in Table 2, the surface 10a of the objective lens 10 includes the inner area 11 formed in a region having a height 1.600 mm or less from the optical axis, and the outer area 12 formed in a region having a height 1.600 mm or more from the optical axis.

The inner area 11 is configured such that both of the laser beams L1 and L2 are suitably converged onto the recording surfaces of the optical discs D1 and D2, respectively. More specifically, the inner area 11 is configured such that a wavefront aberration of each of the laser beams L1 and L2 passing therethrough is reduced to a value smaller than or equal to 0.1λ.

The outer area 12 is configured such that the laser beam L1 passing therethrough is suitably converged onto the recording surface of the optical disc D1. More specifically, the outer area 11 is configured such that a wavefront aberration of the laser beam L1 passing therethrough is reduced to substantially zero and a large amount of wavefront aberration is caused to the laser beam L2 passing therethrough. By this structure, the outer area 12 functions as an aperture stop for the laser beam L2. The outer area 12 has the configuration different from the inner area 11.

The surfaces 10a and 10b are aspherical surfaces which are expressed by a following equation:

$$X(h) = \frac{Ch^2}{1 + \sqrt{1-(1+\kappa)C^2h^2}} + A_4h^4 + A_6h^6 + A_8h^8 + A_{10}h^{10} + A_{12}h^{12}$$

where X(h) represents a SAG amount which is a distance between a point on the aspherical surface at a height of h from the optical axis and a plane tangential to the aspherical surface at the optical axis. κ represents a conical coefficient, and $A_4, A_6, A_8, A_{10}$ and $A_{12}$ are aspherical coefficients of $4^{th}$, $6^{th}$, $8^{th}$, $10^{th}$ and $12^{th}$ orders, respectively. C is curvature of the aspherical surface on its optical axis.

Table 3 shows aspherical coefficients and the conical coefficient of the surfaces #1 and #2 of the objective lens 10.

minute step structure includes a plurality of annular zones divided by steps concentrically formed about the optical axis. In Table 4, a range of height of each annular zone is indicated by hmin and hmax (i.e., each annular zone is formed in a range of height from hmin to hmax), and the additional optical path length given by each annular zone to the laser beam passing therethrough is also indicated for each annular zone.

TABLE 4

|  | hmin | hmax | additional optical path length |
|---|---|---|---|
| inner area 11 | | | |
| annular zone group 111 | 0.000 | 0.649 | −1.10 |
| | 0.649 | 0.847 | −1.09 |
| | 0.847 | 0.957 | −1.09 |
| | 0.957 | 1.036 | −1.09 |
| | 1.036 | 1.099 | −1.09 |
| | 1.099 | 1.152 | −1.09 |
| | 1.152 | 1.198 | −1.09 |
| | 1.198 | 1.238 | −1.09 |
| | 1.238 | 1.274 | −1.09 |
| | 1.274 | 1.307 | −1.09 |
| | 1.307 | 1.337 | −1.09 |
| | 1.337 | 1.366 | −1.09 |
| | 1.366 | 1.392 | −1.09 |
| return step BS1 | 1.392 | 1.416 | 4.95 |
| annular zone group 112 | 1.416 | 1.439 | −1.00 |
| | 1.439 | 1.461 | −1.00 |
| | 1.461 | 1.482 | −1.00 |
| | 1.482 | 1.502 | −1.00 |
| | 1.502 | 1.520 | −1.00 |
| | 1.520 | 1.539 | −1.00 |
| | 1.539 | 1.556 | −1.00 |
| | 1.556 | 1.572 | −1.00 |
| | 1.572 | 1.588 | −1.00 |
| return step BS2 | 1.588 | 1.600 | 1.00 |
| outer area 12 | | | |
| outer area 12 | 1.600 | 1.613 | −1.00 |
| | 1.613 | 1.637 | −1.00 |
| | 1.637 | 1.659 | −1.00 |
| | 1.659 | 1.681 | −1.00 |
| | 1.681 | 1.702 | −1.00 |
| | 1.702 | 1.722 | −1.00 |
| | 1.722 | 1.742 | −1.00 |
| | 1.742 | 1.761 | −1.00 |
| | 1.761 | 1.780 | −1.00 |
| | 1.780 | 1.798 | −1.00 |
| | 1.798 | 1.816 | −1.00 |
| | 1.816 | 1.833 | −1.00 |
| | 1.833 | 1.850 | −1.00 |
| | 1.850 | 1.866 | −1.00 |
| | 1.866 | 1.883 | −1.00 |
| | 1.883 | 1.898 | −1.00 |
| | 1.898 | 1.914 | −1.00 |
| | 1.914 | 1.929 | −1.00 |
| | 1.929 | 1.944 | −1.00 |
| | 1.944 | 1.950 | −1.00 |

TABLE 3

| surface | κ | A4 | A6 | A8 | A10 | A12 |
|---|---|---|---|---|---|---|
| 1 (h < 1.600) | −0.6050 | −8.6510E−04 | −3.6860E−04 | −2.9360E−05 | −1.5560E−05 | −2.6420E−06 |
| 1 (h ≥ 1.600) | −0.6050 | −8.5590E−04 | 2.0170E−04 | −4.9510E−05 | 4.3410E−06 | 4.7770E−06 |
| 2 | 0.0000 | 2.3180E−02 | −7.7700E−03 | 1.5870E−03 | −1.9370E−04 | 1.0540E−05 |

Table 4 shows a detailed configuration of the minute step structure formed in the inner area 11 and the outer area 12 of the surface 10a of the objective lens 10. In Table 4, the As shown in Table 4, the inner area 11 is divided into the annular zone group 111 formed in a region having the height up to 1.416 mm and the annular zone group 112 formed in a region having a range of height from 1.416 mm to 1.600 mm. The annular zone group 111 includes thirteen annular zones, and the annular zone group 112 includes nine annular zones. The return step BS1 is formed between the annular zone groups 111 and 112.

The annular zone group 111 is configured to give an optical path length difference of −14.23λ1 (i.e., a phase shifting amount of −28.46π) to the laser beam L1. The annular zone group 112 is configured to give an optical path length difference of −9.00λ1 (i.e., a phase shifting amount of −18.00π) to the laser beam L2.

The return step BS2 is formed between the inner area 11 and the outer area 12 so that the return step BS2 gives an optical path length difference of 1.00λ1 (i.e., a phase shifting amount of 2.00π) to the laser beam L1.

The minute step structure (annular zone structure) shown in Table 4 can be considered to be a diffracting structure which is defined by an optical path difference function Φ(h) which is expressed by:

$$\Phi(h)=(P_0+P_2h^2+P_4h^4+P_6h^6+\ldots)\times m\times\lambda$$

where $P_0$, $P_2$, $P_4$ and $P_6$ are coefficients of 0-th, second, fourth and sixth orders, h represents a height from the optical axis, m represents a diffraction order, and λ represents a working wavelength used for the recording/reproducing operation. With regard to the inner area 11, m represents a diffraction order for each of the laser beam L1 and L2. With regard to the outer area 12, m represents a diffraction order for the laser beam L1.

The optical path difference Φ(h) indicates a difference of an optical path length of a hypothetical ray of light which does not pass through the diffractive lens structure and an optical path length of a ray of light which is diffracted by the diffraction lens structure, at the height h from the optical axis. In other words, the optical path difference Φ(h) represents the additional optical path length of each ray of light which is diffracted by the diffractive lens structure. The step formed in each area (i.e. the additional optical path length) is designed to have a size equal to one wavelength for a blazed wavelength.

Table 5 shows values of the coefficients of the optical path difference function Φ(h) applied to the diffracting structure formed in the surface 10a of the objective lens 10. As shown in Table 5, the annular zone group 111 is blazed at the wavelength of 720 nm, the annular zone group 112 is blazed at the wavelength of 660 nm, and the outer area 12 is blazed at the wavelength of 660 nm.

$$\phi_i(h_i)-\phi_i(h_{i-1})=\phi_i(1.416)-\phi_i(0)=-13.5$$

$$\phi_{i+1}(h_{i+1})-\phi_{i+1}(h_i)=\phi_2(1.600)-\phi_1(1.416)=-9.8$$

It is understood from the above listed values regarding the conditions (1) to (10) that the objective lens 10 according to the first example satisfies all of the conditions (1) to (10). By satisfying the conditions (1) to (10) (i.e., by forming the return step BS1 which satisfies the conditions (1) to (10) on the objective lens 10), the objective lens 10 according to the first example suitably converges the laser beams L1 and L2 onto the recording surfaces of the optical discs D1 and D2, respectively, while suppressing the change of the spherical aberration caused by the temperature variation. It is noted that such an advantage of the objective lens 10 is attained even if the objective lens 10 is made of resin.

Tables 6 and 7 show simulation results of shapes of beam spots formed on the recording surface of the DVD by the objective lens 10 according to the example and by an objective lens according to a comparative example when the DVD is used. The objective lens according to the comparative example has substantially the same configuration as that of the fist example but is configured not to have the return steps BS1 and BS2.

Table 6 shows the simulation results of the beam spots when the wavelength of the laser beam emitted by the light source changes by 10 nm from the design wavelength. Table 7 shows the simulation results of the beam spots when the ambient temperature changes by 50° C. from a design temperature. The change of 50° C. in ambient temperature is generally thought to correspond to the wavelength shift of approximately 10 nm.

TABLE 6

| | spot diameter | | change of |
| --- | --- | --- | --- |
| | [μm] | Rate of change [%] | amount of of light [%] |
| design value | 0.834 | — | 100.0 |
| first example | 0.834 | 0.00 | 97.1 |
| comparative example | 0.832 | −0.20 | 97.6 |

TABLE 5

| surface | P0 | P2 | P4 | P6 | blazed wavelength |
| --- | --- | --- | --- | --- | --- |
| 1 (h < 1.416) | 0.0000E+00 | 0.0000E+00 | −2.6660E+00 | −3.4400E−01 | 720 nm |
| 1 (h < 1.600) | 6.0000E+00 | 0.0000E+00 | −2.6660E+00 | −3.4400E−01 | 660 nm |
| 1 (h ≥ 1.600) | 2.0000E+00 | −6.9700E−01 | −2.6640E+00 | 7.7000E−02 | 660 nm |

With regard to the above mentioned conditions, the optical system (objective lens 10) is configured to provide the following values.

$$\Delta\psi 1=9.90\pi$$

$$\frac{\Delta OPD}{\lambda 1}=4.95$$

$$\phi_{i+1}(h_i)-\phi_i(h_i)=\phi_2(1.416)-\phi_1(1.416)=6.0$$

TABLE 7

| | spot diameter | | change of |
| --- | --- | --- | --- |
| | [μm] | Rate of change [%] | amount of of light [%] |
| design value | 0.834 | — | 100.0 |
| first example | 0.836 | 0.23 | 96.7 |
| comparative example | 0.843 | 1.07 | 92.9 |

As can be seen from Tables 6 and 7, with regard to the objective lens 10 according to the first example, the difference between the beam spot size of the design value and the beam spot size after the temperature change or after the wavelength change is negligible. That is, the simulation results in Tables 6 and 7 show that the objective lens 10 according to the first example is capable of forming a suitable beam spot even if the ambient temperature or the wavelength changes.

By contrast, the spot diameter formed by the objective lens according to the comparative example changes with the temperature variation and the wavelength variation. That is, the objective lens according to the comparative example can not attain the advantage that the objective lens 10 according to the example has.

Although the present invention has been described in considerable detail with reference to certain preferred embodiments thereof, other embodiments are possible.

In the above mentioned embodiment, the inner area 11 is provided with one annular zone structure having two annular zone groups (111 and 112) and the return step (BS1) formed between the two annular zone groups. However, the objective lens may be provided with a plurality of annular zone structures each of which has two annular zone groups and a return step formed between the two annular zone groups.

It should be noted that the number of annular zones in each of the inner area 11 and the outer area 12 is shown in the above embodiment by way of example. The number of annular zones in the inner area 11 or the outer area 12 is not limited to the number shown in the embodiment.

The objective lens 10 may be configured not to have the return step BS2 if the outer area 12 is properly configured to converge the laser beam L1 onto the recording surface of the optical disc D1 with the spherical aberration being suppressed sufficiently.

In the above mentioned embodiment, the outer area 12 is configured to be the aperture stop for the laser beam L2. It is also possible to configure the outer area 12 such that the outer area 12 has the function of enhancing quality of the beam spot (e.g. decreasing side lobes) as well as the function as the aperture stop for the laser beam L2. Such a function of the outer area 12 can be attained by designing the outer area 12 by appropriately controlling the amount of the wavefront aberration caused in the outer area 12 during use of the laser beam L2.

The present disclosure relates to the subject matter contained in Japanese Patent Application No. P2004-005820, filed on Jan. 13, 2004, which is expressly incorporated herein by reference in its entirety.

What is claimed is:

1. An objective lens for recording data to and/or reproducing data from first and second optical discs, the first optical disc having a recording density higher than that of the second optical disc, a first light beam being used for the first optical disc, a second light beam being used for the second optical disc, the second light beam having a wavelength longer than that of the first light beam, the objective lens comprising at least one surface including a plurality of annular zones divided by steps, the steps having functions of phase shifting a wavefront of light passing through the plurality of annular zones so that a beam spot formed at a converging point of an average wavefront of the wavefront phase shifted by the steps is used for recordation and/or reproduction for the first and second optical discs, the plurality of annular zones of the at least one surface including at least one annular zone structure, the at least one annular zone structure including:

first and second annular zone groups each of which has at least three steps for phase shifting the wavefront in a first direction; and a first return step which is a step formed at a boundary between the first and second annular zone groups, the first return step phase shifting the wavefront in a second direction opposite to the first direction, wherein an absolute value $|\Delta\psi 1|$ of a phase shifting amount of the first light beam given by the first return step satisfies a condition:

$$6\pi < |\Delta\psi 1| < 14\pi \qquad (1),$$

wherein the absolute value $\Delta\psi 1|$ of the phase shifting amount of the first light beam given by the first return step is smaller than larger one of an absolute value of a sum of phase shift amounts given by the first annular zone group and an absolute value of a sum of phase shift amounts given by the second annular zone group.

2. The objective lens according to claim 1, wherein the at least one surface includes an inner area contributing to convergence of both of the first and second light beams and an outer area contributing to only convergence of the first light beam, and wherein the first return step is formed within the inner area.

3. The objective lens according to claim 2, wherein the first optical disc is compliant with a DVD standard, wherein the second optical disc is compliant with a CD standard, and wherein the absolute value $|\Delta\psi 1|$ of the phase shifting amount of the first light beam given by the first return step satisfies a condition:

$$9.4\pi < |\Delta\psi 1| < 10.6\pi \qquad (2).$$

4. The objective lens according to claim 2, wherein the at least one surface includes a second return step which is a step formed at a boundary between the inner area and the outer area, the second return step phase shifting the wavefront in the second direction opposite to the first direction.

5. The objective lens according to claim 2, wherein a wavefront aberration of the first light beam passing through the inner area is lower than or equal to $\pm 0.1\lambda$ at a vicinity of a recording surface of the first optical disc.

6. The objective lens according to claim 1, wherein the objective lens is a single-element lens.

7. An objective lens for recording data to and/or reproducing data from first and second optical discs, the first optical disc having a recording density higher than that of the second optical disc, a first light beam being used for the first optical disc, a second light beam being used for the second optical disc, the second light beam having a wavelength longer than that of the first light beam, the objective lens comprising at least one surface including a plurality of annular zones divided by steps, the steps having functions of giving optical path length differences to light passing through the plurality of annular zones so that a beam spot formed by light passing through the at least one surface is used for recordation and/or reproduction for the first and second optical discs, the plurality of annular zones of the at least one surface including at least one annular zone structure, the at least one annular zone structure including:

first and second annular zone groups each of which has at least three steps for giving optical path length differences in a first direction; and a first return step which is a step formed at a boundary between the first and second annular zone groups, the first return step giving an optical path length difference in a second direction opposite to the first direction, wherein an absolute value |ΔOPD| of an optical path length difference given to the first light beam by the first return step satisfies a condition:

$$3 < \left|\frac{\Delta OPD}{\lambda 1}\right| < 7 \quad (3)$$

where λ1 represents a wavelength of the first light beam, wherein the absolute value |ΔOPD| of the optical path length difference given to the first light beam by the first return step is smaller than larger one of an absolute value of a sum of the optical path length differences given by the first annular zone group and an absolute value of a sum of the optical path length differences given by the second annular zone group.

8. The objective lens according to claim 7, wherein the at least one surface includes an inner area contributing to convergence of both of the first and second light beams and an outer area contributing to only convergence of the first light beam, and wherein the first return step is formed within the inner area.

9. The objective lens according to claim 8, wherein the first optical disc is compliant with a DVD standard, wherein the second optical disc is compliant with a CD standard, and wherein the absolute value |ΔOPD| of the optical path length difference given to the first light beam by the first return step satisfies a condition:

$$4.7 < \left|\frac{\Delta OPD}{\lambda 1}\right| < 5.3. \quad (4)$$

10. The objective lens according to claim 8, wherein the at least one surface includes a second return step which is a step formed at a boundary between the inner area and the outer area, the second return step giving an optical path length difference in the second direction opposite to the first direction.

11. The objective lens according to claim 8, wherein a wavefront aberration of the first light beam passing through the inner area is lower than or equal to ±0.1λ at a vicinity of a recording surface of the first optical disc.

12. The objective lens according to claim 7, wherein the objective lens is a single-element lens.

13. An objective lens for recording data to and/or reproducing data from first and second optical discs, the first optical disc having a recording density higher than that of the second optical disc, a first light beam being used for the first optical disc, a second light beam being used for the second optical disc, the second light beam having a wavelength longer than that of the first light beam, the objective lens comprising at least one surface including a diffracting structure, the diffracting structure including a plurality of annular zones divided by steps so as to provide a function of suitably converging the first and second light beams onto recording surfaces of the first and second optical discs, respectively, the diffracting structure including at least first and second annular zone groups, the first annular zone group and the second annular zone group being located in that order from an optical axis of the objective lens, wherein the diffracting structure is configured to satisfy conditions (5) trough (7) or to satisfy conditions (5), (8) and (9):

$$4 < |\phi_{i+1}(h_i) - \phi_i(h_i)| < 8 \quad (5)$$

$$|\phi_i(h_i) - \phi_i(h_{i-1})| > |\phi_{i+1}(h_i) - \phi_i(h_i)| \quad (6)$$

$$\{\phi_i(h_i) - \phi_i(h_{i-1})\} / \{\phi_{i+1}(h_i) - \phi_i(h_i)\} < 0 \quad (7)$$

$$|\phi_{i+1}(h_{i+1}) - \phi_{i+1}(h_i)| > |\phi_{i+1}(h_i) - \phi_i(h_i)| \quad (8)$$

$$\{\phi_{i+1}(h_{i+1}) - \phi_{i+1}(h_i)\} / \{\phi_{i+1}(h_i) - \phi_i(h_i)\} < 0 \quad (9)$$

where Φi(h) represents an additional optical path length given by the diffracting structure in an i-th annular zone group, and hi represents a height of a boundary position between the i-th annular zone group and a (i+1)-th annular zone group, wherein Φi(h) is expressed by a following equation:

$$\Phi i(h) = (P_{0i} + P_{2i}h^2 + P_{4i}h^4 + P_{6i}h^6 + \ldots) \times m$$

where $P_{0i}$, $P_{2i}$, $P_{4i}$ and $P_{6i}$ are coefficients of 0-th, second, fourth and sixth orders regarding the additional optical path length of the i-th annular zone group, h represents a height from the optical axis, m represents a diffraction order used for recording and/or reproducing operation, and $h_{i-1}$ is 0 if i is 0.

14. The objective lens according to claim 13, wherein the at least one surface includes an inner area contributing to convergence of both of the first and second light beams and an outer area contributing to only convergence of the first light beam, and wherein the boundary position is formed within the inner area.

15. The objective lens according to claim 14, wherein the first optical disc is compliant with a DVD standard, wherein the second optical disc is compliant with a CD standard, and wherein the objective lens satisfies a condition:

$$5.7 < |\phi_{i+1}(h_i) - \phi_i(h_i)| < 6.3 \quad (10).$$

16. The objective lens according to claim 15, wherein the at least one surface has a first step formed at a boundary between the inner area and the outer area, the first step giving an optical path length difference in a direction equal to a direction of the optical path length difference given by the boundary position between the i-th annular zone group and a (i+1)-th annular zone group.

17. The objective lens according to claim 14, wherein a wavefront aberration of the first light beam passing through the inner area is lower than or equal to ±0.1λ at a vicinity of a recording surface of the first optical disc.

18. The objective lens according to claim 13, wherein the objective lens is a single-element lens.

* * * * *